United States Patent Office 3,511,785
Patented May 12, 1970

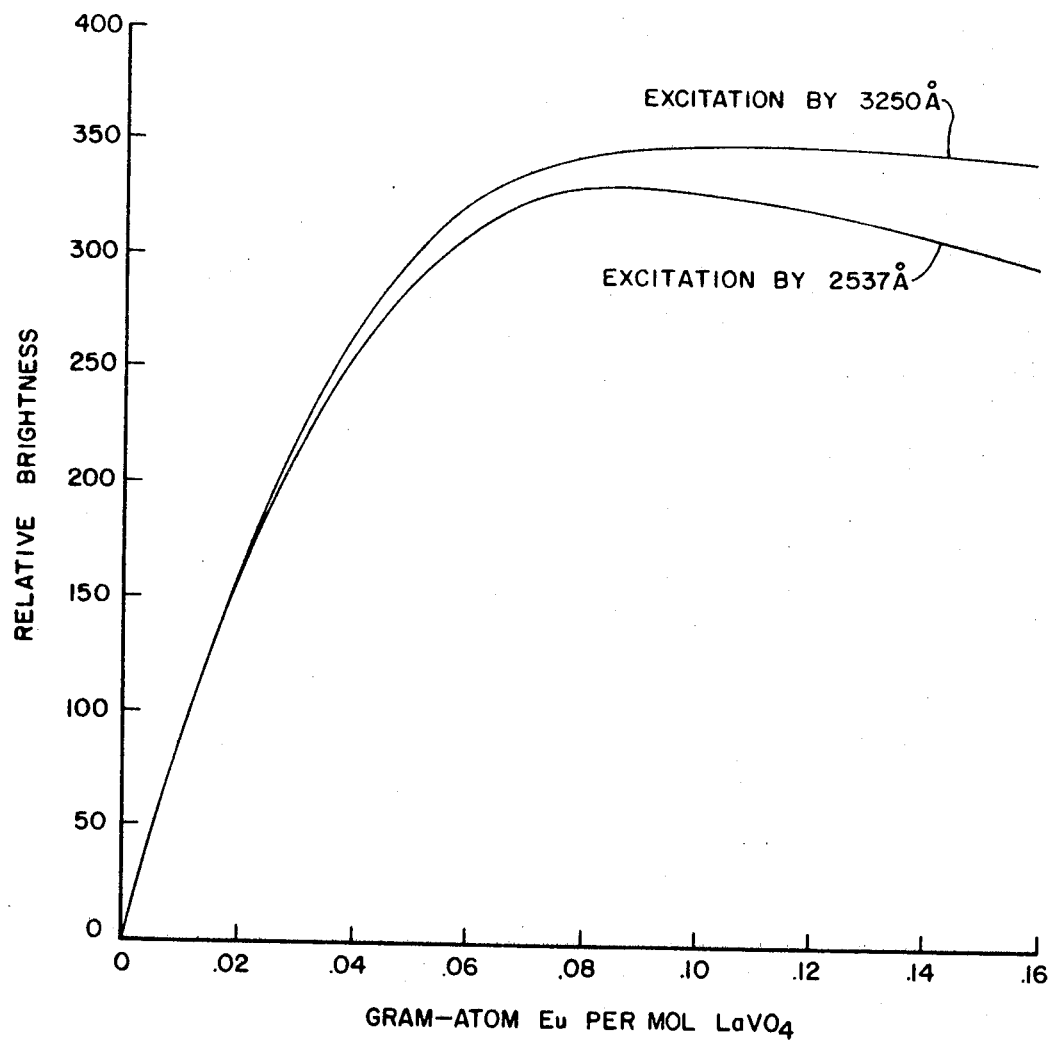

3,511,785
METHOD OF PREPARING RARE-EARTH METAL-ACTIVATED RARE-EARTH METAL VANADATE PHOSPHOR
Richard C. Ropp, Warren, N.J., assignor to Westinghouse Electric Corporation, Pittsburgh, Pa., a corporation of Pennsylvania
Continuation-in-part of application Ser. No. 650,097, June 29, 1967. This application Mar. 17, 1969, Ser. No. 807,746
Int. Cl. C09k 1/44
U.S. Cl. 252—301.4    10 Claims

ABSTRACT OF THE DISCLOSURE

An improved method of preparing rare-earth metal activated rare-earth metal orthovanadate phosphor, particularly for use with discharge devices or for cathode ray tube applications. The raw mix of selected mixed rare-earth metal compounds and selected vanadate compounds is fired with a first flux which provides a specified atom excess of vanadium supplied as sodium or potassium vanadate and preferably as the metavanadate. The first flux is separated from the formed composition and a second flux of alkaline-earth metal halide is added to the composition, which is then refired. The second flux is thereafter removed from the final orthovanadate composition.

CROSS REFERENCE TO RELATED APPLICATIONS

This application is a continuation-in-part of copending application Ser. No. 650,097 filed June 29, 1967, and owned by the present assignee. A related application is copending application Ser. No. 650,098, filed June 27, 1967, also owned by the present assignee.

BACKGROUND OF THE INVENTION

Ths invention relates to a method for preparing particular phosphors for use in high-pressure mercury-vapor lamps, low-pressure mercury-vapor lamps, or cathode ray tubes.

In Patent No. 3,152,085 is described a europium or dysprosium-activated yttrium vanadate phosphor suitable for optical maser applications. Rare-earth activated lanthanum vanadate phosphors are disclosed by F. C. Palliila in the Journal of the Electrochemical Society 112, 776 (1965). These lanthanum vanadate phosphors are stated to have efficiencies much lower than the yttrium vanadate phosphor and, as an example, europium-activated lanthanum vanadate is stated to possess an efficiency only 25% that of europium-activated yttrium vanadate when excited by cathode rays or ultraviolet radiation. This relatively poor efficiency for the lanthanum vanadates is attributed to differences in structure between lanthanum vanadate and yttrium vanadate. A method of preparing europium-activated yttrium vanadate phosphor is taught in U.S. Pat. 3,360,480 issued Dec. 26, 1967. This method teaches the coprecipitation of europium-yttrium vanadate and a subsequent firing with vanadate flux. It would of course be desirable to utilize lanthanum in place of the yttrium since the former is much less costly than the latter. A similar method is taught by U.S. Pat. 3,380,926 which does not utilize the oxalate precipitation.

The rare-earth metal activated rare-earth metal vanadate phosphors of the general formula $Ln_x(VO_4)_y:Ln'_z$ are known in the prior art, where Ln is lanthanum, yttrium, gadolinium, or mixtures thereof, and Ln' is europium, samarium, holmium, erbium. These phosphors may be stoichiometric or non-stoichiometric, as denoted respectively by $x+z=y$ or $(x+z)>y$. The activator amount is known to be variable, and in general z is from about 0.01 to 0.2 mol per mol of vanadate.

SUMMARY OF THE INVENTION

It is the general object of this invention to provide a method for preparing superior rare-earth metal activated rare-earth metal orthovanadate phosphors.

It is another object to provide a method for preparing rare-earth metal activated rare-earth metal vanadate phosphors having a very high degree of crystallinity and brightness, which phosphors are particularly adapted for use with discharge devices or cathode ray tube screens.

It is yet another object of the invention to provide a method of preparing a superior red emitting phosphor having good temperature dependence for use in high pressure mercury vapor lamps.

These foregoing objects and others which will become apparent as the description proceeds are achieved by the method of orthovanadate phosphor preparation wherein, a raw mix is prepared of mixed rare-earth metal oxide or compound reducible to the oxide upon firing, and vanadium oxide or compound reducible to the oxide upon firing. The constituents are included in amounts to approximate a stoichiometric orthovanadate composition. One of the rare-earth metals is present in an activating proportion. A first flux of sodium or potassium vanadate preferably as the metavanadate is added to the raw mix in amounts such as to provide a vanadium atom excess over the amount of vanadium needed to satisfy the stoichiometric orthovanadate composition with said rare-earth metals present. The vanadium atom excess is from 0.10 to 0.70 when sodium metavanadate is the first flux and from 0.4 to 0.90 when potassium metavanadate is the first flux. The resulting mixture is fired to form the orthovanadate composition and the flux is separated therefrom. A second flux of selected alkaline-earth metal halide is added in a predetermined amount to the fired position and this mixture is refired to further improve the crystallinity and brightness of the phosphor composition. The second flux is thereafter separated from the final composition.

BRIEF DESCRIPTION OF THE DRAWING

For a better understanding of the invention, reference should be made to the sole figure wherein phosphor brightness is plotted versus activator concentration for europium-activated lanthanum vanadate prepared according to the method of the present invention.

DESCRIPTION OF THE PREFERRED EMBODIMENTS

In a specific embodiment of the present invention there is first prepared a solution of a predetermined amount o lanthanum containing compound and europium-containing compound wherein the relative gram-atom ratio o europium to lanthanum in the solution is that ratio de sired in the phosphor. As an example, the gram-aton ratio of europium to lanthanum in the solution desirably will be from about 0.05/0.95 to 0.15/0.85. As an ex ample, 325.80 grams of $La_2O_3$ and 35.20 grams of $Eu_2O$ are slowly added to 400 ml. of concentrated nitric acid and heated gently as required to dissolve the oxides com pletely. This solution is then diluted with distilled wate to a total volume of 2500 ml.

A 10% by weight oxalic acid solution is prepared an heated to about 80° C. The oxalic acid solution is slowl added to the rare-earth metal nitric acid solution, whicl is also maintained at 80°. A sufficient amount of oxali acid solution is added to cause the rare-earth metals t precipitate as oxalates. In the present example abou 2,375 ml. of the 10% by weight oxalic acid solution i found to coprecipitate the rare-earth metal oxalates. I addition, about 500 ml. of denatured alcohol can b added to cause complete precipitation and a higher yiel precipitant, as per copending application Ser. No. 7,433 filed Feb. 23, 1968, now Pat. No. 3,420,861, and ned by the present assignee. The precipitate is allowed settle and is washed by decantation and resuspension. is then separated and dried for 24 hours at about 5° C.

As an alternative method for precipitating the rare-th metals as oxalates, the rare-earth oxides are dis-ved as previously outlined and the resulting nitrate ution is cooled to room temperature, and 600 ml. diethyl oxalate is added thereto. The mixture is stirred l heated at a moderate rate until it reaches 75–80° C., example, where it is held for a period of one hour. e diethyl oxalate slowly decomposes under these con-ons and a homogeneous precipitation of the rare-earth dates results. The washing and drying steps as out-:d hereinbefore are then followed. An oxalate method coprecipitation of rare-earth metals is disclosed in ending application Ser. No. 474,102, filed July 22, i5, now Pat. No. 3,449,258, and owned by the present ignee.

n the next step of preparation, one mole of the co-cipitated rare-earth metal oxalate is added to one mole vanadium pentoxide to form the basic raw mix which tains the atom proportions of rare-earth metal and adium needed to satisfy the orthovanadate composi-l stoichiometric formulation. A first flux of 0.4 mole ium metavanadate is added to the raw mix. This ount of sodium metavanadate thus provides a vana-m atom excess of 0.4 per mole of orthovanadate med, over the amount of vanadium which satisfies the chiometric orthovanadate composition formulation, e one mole each of the rare-earth metal oxalate and vanadium pentoxide yields two moles of rare-earth tal orthovanadate.

n the foregoing examples yttrium oxalate or oxide, as l as gadolinium oxalate or oxide can be substituted in le or in part for the lanthanum oxalate or oxide in paring rare-earth metal vanadate phosphors. The opium oxalate or oxide can be substituted for by arium oxide, holmium, oxide, dysprosium oxide and um oxide or oxalates of these metals. The sodium avanadate can be substituted for by potassium meta-adate.

n explanation of the term flux, it has long been wn that the use of a material which has a relatively melting point and forms a liquid phase at relatively derate temperatures, can cause recrystallization of different material with which it is used without enter-into the chemical reaction. Such a material is called ux. However, when vanadates are prepared by solid-e reaction of the oxides, the use of fluxes does not ear to promote crystal growth and normally, phos-rs made by firing the oxalates, or compounds which mpose to form the oxides, and vanadium oxide are more crystalline than those prepared by firing the les alone. In accordance with the present invention, combination of the specified metavanadates as a flux a first firing and alkaline-earth metal chloride or mide as flux for a second firing does have a marked :t on promoting crystallinity in the phosphor.

he foregoing mixture of rare-earth metal oxalates, adium oxide and sodium metavanadate is blended ther and hammer-milled. This mixture is fired for 4 rs at a temperature of 1100° C. in an atmosphere prising oxygen. This particular firing temperature ot critical nor is the firing time, but as a practical ter the initial firing temperature is from 700° C. to 0° C. with a firing time of at least two hours within ch range the orthovanadate will form yet not be reciably hard sintered. It is preferred to fire in an osphere comprising oxygen, such as air, in order to trol the valence of the activator when the phosphor rmed during this firing. Since a second firing is used, ever, the first firing could be conducted in other than an atmosphere comprising oxygen since the valence state of the activator (presumable +3) will be determined by the last firing step. The function of the first firing is to form the separate crystals of the phosphor and in the presence of the sodium metavanadate and oxalate compounds, the resulting material has a reasonably high degree of crystallinity.

After the first firing, the resulting phosphor is cooled and then washed in deionized water. This removes the sodium metavanadate flux and the resulting phosphor is dried at a temperature sufficient to insure removal of water, for example at a temperature of about 105° C. for several hours.

In the next step of preparation, it has been found that a second firing of the already activated phosphor with selected fluxes produces superior crystallinity while maintaining superior brightness, especially for use in high pressure mercury vapor lamps.

The europium activated lanthanum vanadate phosphor is mixed with calcium chloride flux, with the flux present in an amount of about 10% by weight of the phosphor composition. The mixture is then refiired to improve the crystallinity while maintaining the superior brightness characteristic of the phosphor composition.

This refiring is carried out in an atmosphere comprising oxygen, preferably air, for four hours at a temperature of 1200° C. The resulting mixture is refired after being thoroughly mixed. The refiring is conducted in an atmosphere comprising oxygen, for example, in air, for four hours at a temperature of 1200° C. The firing temperature is not particularly critical, but as a practical matter, the firing temperature is from 700° C. to 1350° C. with a firing time of at least two hours. Upon cooling, the phosphor is again washed in water in order to remove the flux, and it is then dried.

In another example of the present method, a raw mix is prepared of one mole of yttrium-europium oxalate, one mole of vanadium pentoxide. To this a first raw mix is added 0.7 mole of potassium metavanadate, to thus provide a vanadium-atom excess of 0.70 per mole of orthovanadate formed. The mixture is fired as described in the foregoing, and after cooling and washing to remove the first flux, a second flux of calcium chloride in an amount of 10% by weight of the activated orthovanadate composition is added. The phosphor composition and second flux are fired as explained in the foregoing to further improve the crystallinity and brightness of the resulting orthovanadate luminescent composition.

It has been found that when sodium metavanadate is used as the first flux that the vanadium atom excess per mole of orthovanadate formed is from 0.10 to 0.70, and is preferably 0.40. When potassium metavanadate is used as the first flux the vanadium atom excess per mole of orthovanadate formed is from 0.40 to 0.90, and is preferably 0.70.

While coprecipitated rare-earth metal oxalates have been used in the preferred embodiments of the present method other rare-earth metal compounds, such as the oxides or other compounds readily heat reducible to the oxide can be used. Similarly, while the vanadium pentoxide is preferably used to supply vanadium to the raw mix, other vanadium compounds which readily decompose to the oxide upon heating can be used.

The foregoing example specified the use of calcium chloride as the flux to be added to the phosphor composition can be similarly utilized. The amount of calcium chloride flux is preferably used in an amount of about 10% by weight of the phosphor composition. Other alkaline-earth metal halide fluxes such as calcium bromide can be used and in general the alkaline-earth metal chlorides or bromides are preferably added in amounts of from about 6 to 15% by weight of the phosphor composition. The use of greater proportions of alkaline-earth metal halide flux results in a hard sintered luminescent material.

The resulting phosphors have a bright emission under excitation either by ultraviolet or cathode rays. They are suitable for use in high-pressure mercury discharge lamps or other discharge lamps or in conjuncture with color television or X-ray tubes. The particles size of the phosphor can vary from about 4.0 microns to 35.0 microns, depending upon the firing temperature and times. For use in conjunction with discharge devices, a particle size of about 15.0 microns appears to be very desirable, and for use in conjunction with color television tubes, a particle size of about 11.0 microns appears to be very desirable.

When yttrium oxide is used instead of lanthanum oxide a very efficient red emitting suitable for use with high pressure mercury vapor discharge devices is provided. The phosphor is readily excited by the wide range of ultraviolet radiation of the discharge device. It has been discovered that when the yttrium vanadate, europium activated phosphor is intended for use with discharge devices the red emission capacity is best when the atom ratio of yttrium to europium is from 0.04 to 0.10, and preferably 0.07 to 0.09. The percentage of emitted radiation observed in the red portion of the spectrum and the 100 hr. red lumen maintenance is superior for the $YVO_4$:EU phosphor prepared according to the foregoing method.

It should be observed that the sodium or potassium metavanadate flux can be formed during the actual firing of the first mixture by including sufficient excess vanadium pentoxide and sodium, or potassium carbonate in the mixture. Thus, during firing the respective sodium or potassium metatvanadate is formed to serve as the first flux. The amounts of the vanadium compound and sodium or potassium compound is determined to provide the atom excess of vanadium as specified in the foregoing description.

The effect on phosphor emission with varying activator concentrations for particular embodiment is shown in the sole figure of the drawing. The phosphor $LaVO_4$:En was individually excited by 2537 A.U. and 3250 A.U. in taking the illustrated brightness curves. It is preferred in the europium-activated lanthanum vanadate phosphor that the atom ratio of lanthanum to europium is from about 1/0.06 to 1/0.15, with the effect of europium activator concentration on phosphor relative brightness is shown in the sole figure.

In practicing the present invention it has been found that by using vanadium pentoxide which has been acid washed in a nitric acid or hydrochloric acid solution, the brightness of the resulting phosphors is further improved. It is not clear why this is so because no change in chemical purity is observed by virtue of the acid washing. The vanadium pentoxide is preferably treated by washing it in a warm 1 to 10 molar concentration nitric acid solution, or in a warm 1 to 6 molar concentration hydrochloric acid solution. The acid solutions work best when maintained at about 80° C.

It will be recognized that the objects of the invention have been achieved by providing an improved method for producing rare-earth metal-activated rare-earth metal orthovanadate phosphor which is particularly adapted for use in conjunction with dischrage devices, either of the low pressure of high pressure type, or in conjunction with color television or X-ray tubes.

I claim as my invention:

1. Method of preparing rare-earth metal activated rare-earth metal orthovanadate phosphor composition of the general formula $Ln(VO_4)$:Ln', wherein Ln is lanthanum, yttrium, gadolinium, or mixtures thereof, Ln' is europium, samarium, dysprosium, holmium, or erbium, and Ln' is present in an activating proportion, which method comprises:

(a) preparing a raw mix comprising Ln and Ln' oxide or Ln and Ln' compound reducible to the oxide upon firing, and vanadium oxide or vanadium compound reducible to the oxide upon firing, said Ln, Ln' and vanadium being included in amounts to approximate a stoichiometric orthovanadate composition;

(b) adding to said raw mix a first flux of sodium or potassium vanadate preferably as the metavanadate in amounts such as to provide vanadium gram atom excess over the amount of vanadium needed to satisfy the stoichiometric orthovanadate composition with said rare-earth metals present, said vanadium gram atom excess per mole of orthovanadate to be formed being from 0.10 to 0.70 when sodium metavanadate is said first flux, and from 0.40 to 0.090 when said potassium metavanadate is said first flux;

(c) firing the resulting mixture at a predetermined temperature for predetermined time to form said orthovanadate composition and thereafter separating said orthovanadate composition from said first flux;

(d) adding to said orthovanadate composition a second flux consisting essentially of selected alkaline-earth metal halide in an amount of from 6 to 30 weight percent of the formed orthovanadate composition; and (e) firing the mixture of said orthovanadate composition and said second flux at a predetermined temperature for predetermined time to further improve the luminescent performance of said phosphor, and thereafter separating said improved orthovanadate composition from said second flux.

2. The method as specified in claim 1, wherein said Ln and Ln' are preferably added to said raw mix as coprecipitated oxalates.

3. The method as specified in claim 1, wherein said second flux is preferably calcium chloride.

4. The method as specified in claim 1, wherein said raw mix and said first flux are fired at from 700° to 1400° C. for at least two hours with the lower the temperature the longer the firing time.

5. The method as specified in claim 1, wherein said orthovanadate composition and said second flux are fired at from 700° to 1350° C. for at least two hours with the lower the temperature the longer the fiiring time.

6. The method as specified in claim 1, wherein when vanadium pentoxide is utilized to supply vanadium to said raw mix, said vanadium pentoxide is washed in a warm acidic solution of from 1 M to 10 M nitric acid, or 1 M to 6 M hydrochloric acid prior to incorporation into said raw mix.

7. The method as specified in claim 1, wherein when Ln is yttrium and Ln' is trivalent europium, and said orthovanadate composition is to be excited to luminescence by a high pressure mercury vapor discharge, and the atom ratio of yttrium to europium is preferably from 1/0.07 to 1/0.09 to maximize temperature stability of said phosphor.

8. The method as specified in claim 1, wherein when Ln is lanthanum and Ln' is trivalent europium, and said orthovanadate composition is to be excited to luminescence by a high pressure mercury vapor discharge, and the atom ratio of lanthanum to europium is preferably from 1/0.06 to 1/0.15 to maximize temperature stability of said phosphor.

9. The method as specified in claim 1, wherein when said sodium metavanadate is said first flux, said gram atom excess of vanadium is preferably 0.40.

10. The method as specified in claim 1, wherein when said potassium metavanadate is said first flux, said gram atom excess of vanadium is preferably 0.70.

References Cited

UNITED STATES PATENTS

| | | | |
|---|---|---|---|
| 3,152,085 | 10/1964 | Ballman et al. | 252—301.4 |
| 3,322,682 | 5/1967 | Thompson | 252—301.4 |
| 3,368,980 | 2/1968 | Avella et al. | 252—301.4 |

TOBIAS E. LEVOW, Primary Examiner

R. D. EDMONDS, Assistant Examiner